3,579,505
Patented May 18, 1971

3,579,505
ALISOL COMPOUNDS
Masuo Miyamoto, Kyoto, and Tadakazu Murata, Suita, Japan, assignors to Takeda Chemical Industries, Ltd., Osaka, Japan
No Drawing. Filed Sept. 25, 1968, Ser. No. 762,637
Int. Cl. C07c 169/38, 173/00
U.S. Cl. 260—239.55                             17 Claims

ABSTRACT OF THE DISCLOSURE

The crude extract of an Alismataceae plant or saponification product thereof is brought into contact with an acid (mineral acid, sulfonic acid, carboxylic acid, Lewis acid) whereby the Alisol B contained in the extract is converted into Alisol A. The Alisol compounds of the invention, including Alisol A itself, show hypercholesterolemic actviities.

This invention relates to Alisol compounds, which were obtained for the first time by the present inventors and found to have hypocholesterolemic activity.

More particularly, the present invention is concerned with a method of producing Alisol A compounds of the Formula I (I)

by a chemical conversion of Alisol B compounds of the Formula II (II)

and with a process for isolating naturally occurring Alisol B compounds. In said formulae, each of $R^1$, $R^2$, $R^3$ and $R^4$ is hydrogen, an acyl of lower monocarboxylic acid having at most 4 carbon atoms or a lower alkoxycarbonyl having at most 5 carbon atoms, $R^2$ and $R^3$, taken together, represent an alkylidene having 1 to 5 carbon atoms.

The rhizomes of the Alismataceae plants, especially *Alisma Plantago-aquatica* L. var. *orientale* Samuels, have long been used as a drug in China, but nothing was known with respect to the essential ingredient or ingredients.

The present inventors succeeded in isolating from the rhizomes of the said plants two new triterpenes, named Alisol A and Alisol B, which are interrelated as to chemical structure, and the respective monoacetates. Definite chemical structures of these naturally occurring triterpenes have now been clarified by the present inventors as follows:

Alisol A: (I) where each of $R^1$, $R^2$, $R^3$ and $R^4$ stands for a hydrogen atom.
Alisol A monoacetate: (I) where each of $R^1$, $R^2$ and $R^4$ stands for a hydrogen atom, and $R^3$ stands for an acetyl group.
Alisol B: (II) where each of $R^1$ and $R^2$ stands for a hydrogen atom.
Alisol B monoacetate: (II) where $R^1$ stands for a hydrogen atom, and $R^2$ stands for an acetyl group.

The principal object of the present invention is to provide a method for the chemical conversion of Alisol B compounds to Alisol A compounds.

Another object of this invention is to provide a method for the production of Alisol B and/or its 23-monoacetate through extraction of a plant of Alismataceae or "processed matter" thereof.

A further object of the invention is to provide novel and useful compounds closely related to Alisol A and Alisol B.

(I) Isolation of Alisol B and its 23-monoacetate

The materials used according to this aspect of the invention include Alismataceae plants such as *Sagittaria trifolia* L., *Sagittaria Aginashi* Makino, *Sagittaria Pygmaea* Mig., *Alisma Plantago-aquatica* L., *Alisma Plantago* L. var. *orientale* Samuels, *Alisma canaliculatum* A. Br. et Bouché, *Caldesia reniformis* Makino, etc. and while the entire plant can be utilized, it is generally most advantageous to use the rhizomes. Further, it is advantageous to employ dried and crushed materials (so-called "processed matter"); fresh materials can also be utilized.

The first stage of the process of the present method consists in the extraction of the above-mentioned materials with a suitable solvent. When fresh material is employed, the extraction is advantageously conducted in a homogenizer.

The suitable solvents mentioned just above are selected from petroleum ether, petroleum benzin, alicyclic or aromatic hydrocarbons such as cyclohexane, benzene, toluene, etc., halogenated hydrocarbons such as chloroform, methylene chloride, carbon tetrachloride, etc., esters such as ethyl acetate, butyl acetate, etc. and ketones such as acetone, methyl ethyl ketone, methyl isobutyl ketone, etc., as well as a mixture of two or more of them. Among these organic solvents, chloroform gives best results.

After the extraction, the solvent is distilled off at atmospheric or reduced pressure to obtain a crude extract. At this stage no particular attention is necessary, because the naturally occurring Alisol compounds are fairly stable.

In thus-obtained extract, there are contained a predominant amount of Alisol B and its 23-monoacetate, particularly the latter (about in the 10-fold quantity) relative to that of the Alisol A and its 24-monoacetate; the latter two have also been extracted along with Alisol B or its 23-monoacetate.

It should be noted that the crude extract can be subjected to the conversion of the Alisol B compounds into the Alisol A compounds as will be set forth in detail hereinafter.

For the purpose of isolation of Alisol B and/or its 23-monoacetate from the crude extract, the extract is submitted to adsorption or partition chromatography with the use of a suitable adsorbent (carrier). This process usually yields both Alisol B and Alisol B 23-monoacetate. While the Alismataceae plant or the crude extract is treated with a suitable saponifier for the purpose of facilitating the separation of non-saponifiable neutral lipids therefrom, Alisol B 23-monoacetate is also saponified to change it into Alisol B and is isolated as Alisol B. At this stage, the epoxide ring in Alisol B may partially open, depending on the reaction conditions, to give almost exclusively an epimer of Alisol A (24-epi-Alisol A), but the coexistence of the 24-epi-Alisol A does not disturb the subsequent procedure for purifying Alisol B and the epimer itself can be isolated, if desired, by such chromatography as described below.

In this connection, said suitable saponifiers are exemplified by the hydroxide or carbonate of an alkali metal, more concretely, sodium hydroxide, potassium hydroxide, sodium bicarbonate, potassium bicarbonate, sodium carbonate, potassium carbonate and various mixtures thereof.

The adsorbent (carrier) for use in the chromatographic treatment may be selected from materials which are conventional in the art of chromatography, e.g. alumina, silica gel, synthetic magnesium silicate (Florisil), silicic acid, activated carbon, Hyflo-Supercel, starch, diatomaceous earth, starch, filter paper, etc.

For industrial purposes, the use of silica gel, alumina or activated carbon is recommended.

As for the solvent for the developer which can be employed for chromatography in accordance with the present method, such suitable solvents as petroleum benzin, ethyl ether, benzene, chloroform, carbon tetrachloride, methylene chloride, ethyl acetate, acetone, methanol, ethanol, n-butanol, etc. as well as their mixtures of various mixing rates are employed.

The chromatographic treatment mentioned above is advantageously conducted in more than one cycle continuously or, alternatively, intermittently with a solvent treatment interposed between any two cycles, as and whichever is necessary.

Thus, Alisol B and Alisol B 23-monoacetate are isolated from the fat-soluble fraction in the manner above described.

On recrystallization from ethyl acetate, Alisol B is obtained as colorless prisms melting at 166°–168° (measured on Kofler block) and showing $[\alpha]_D^{23} +130° \pm 7°$ (c.=1.0, chloroform). Its molecular formula is $C_{30}H_{48}O_4$.

Like Alisol B, Alisol B 23-monoacetate crystallizes and, on recrystallization from ethyl acetate or a mixture of ethyl acetate and n-hexane, it forms colorless prisms melting at 162°–164° C. (measured on a Kofler block) and showing $[\alpha]_D^{23} +121° \pm 6°$ (c.=1.0, chloroform).

Thus-obtained Alisol B can be acylated, for example into Alisol B 23-monoacetate and/or Alisol B 11,23-diacetate by means of suitable acylating agents.

When the acetate is to be produced, the acetylation can be suitably conducted at room temperature (15 to 30° C.) by means of acetic anhydride in pyridine or alternatively with acetyl chloride in N,N-dimethylformamide.

Alisol A and/or its 24-monoacetate contained in the original extract can also be isolated, if desired, in the same manner as Alisol B and its monoacetate from other fractions which are usually eluted after the elution of the fractions containing Alisol B and/or its 23-monoacetate. However, Alisol A and its 24-monoacetate separated by the above procedure are small in quantity, because the compounds are generally minor components.

In view of the hypocholesterolemic action of the said Alisol A compounds, it is desired to convert the Alisol B compounds to Alisol A compounds.

(II) Conversion of Alisol B compounds into Alisol A compounds

According to the present invention, the desired conversion is effected by bringing the Alisol B compounds into contact with an acid, usually in a liquid phase. It is to be noted that the Alisol B compounds are not limited to the naturally occurring Alisol B and its 23-monoacetate, but include those represented by the Formula II.

The acids employed for the purpose include, for example oxalic acid, citric acid, benzoic acid, hydroxybenzoic acid; mineral acids such as sulfuric acid, hydrochloric acid, phosphoric acid; and sulfonic acids such as p-toluenesulfonic acid, benzenesulfonic acid. So-called Lewis acids such as boron trifluoride, aluminum chloride can generally also be employed. Among these acids, sulfuric acid gives best results. These acids can be used either singly or in combination.

The present method is preferably carried out in a suitable solvent, which can be selected from among various ethers such as ethyl ether, dioxane, tetrahydrofuran, ethylene glycol dimethyl ether or the like, lower alcohols such as methanol, ethanol or the like, aromatic hydrocarbons such as benzene, toluene or the like, and halogenated hydrocarbons such as chloroform, methylene chloride, carbon tetrachloride or the like. Aside from the solvents mentioned above, such acid solvents as formic acid, acetic acid, etc. are used advantageously because they function as the solvent as well as the acid to be employed according to the present method. These solvents can also be employed in admixture with a suitable amount of water.

The reaction is generally conducted at room temperature (about 18° to 30° C.) or under heating (about 30° to 90° C.), although the optimum temperature varies with different types of starting materials, solvents, acid and other conditions.

The reaction is usually completed in about 0.5 to 1.5 hours.

The desired product Alisol A compounds are isolated from the reaction mixture by conventional purification means. For example, water is added to the reaction mixture and the resulting precipitates which separate out of the mixture are collected by filtration. Alternatively, the reaction product is extracted by shaking with a suitable organic solvent which is not freely miscible with water, such as benzene, ethyl acetate or chloroform.

Thus-obtained Alisol A compounds can be directly purified by recrystallization or by adsorption or partition chromatography, described in the isolation of the naturally occurring Alisol B compounds. In the latter instance, as the adsorbent (carrier), use can be made of those materials which are referred to hereinbefore, but in this case silica-gel is particularly advantageous.

In this manner, for example, pure Alisol A is obtained as colorless powder and shows $[\alpha]_D^{26} +100° \pm 5°$ (c.=1.0, chloroform). Pure Alisol A 24-monoacetate forms colorless prisms melting at 194° to 196° C. (measured on Kofler block) and shows $[\alpha]_D^{23} +86° \pm 5°$ (c.=1.0, chloroform).

It is noteworthy that generally the said conversion with acid does not affect the ring system of the Alisol compounds, and stereochmistry at the 24-position of the starting Alisol B compounds remains unaltered in the produced Alisol A compounds.

However, during the conversion reaction there may occur some modifications in the substituents between Alisol B compounds (II) and Alisol A compounds (I) at the positions 11 and 23 as well as at the positions 24 and 25 at which the epoxy group in the Alisol B compounds is opened to form two oxygenated groups in the Alisol A compounds.

For example, the acyl group at the 23-position migrates to the 24-position as is seen in the case that Alisol B 23-monoacetate is converted to Alisol A 24-monoacetate.

Another example of modification in the substituents is seen when the Alisol B compound is treated with an acid as in the case when Alisol B is heated in acetic acid, whereupon the corresponding acyloxy group is introduced at the 24-position of the Alisol A compound.

Further, it is an interesting example of such modification in the substituents that when the Alisol B compounds is brought into contact with the acid in a lower aliphatic ketone such as acetone or methyl ethyl ketone, the resulting Alisol A compound is obtained as a 23,24-ketonide or, in case of the 23-position being occupied by acyloxy, as a 24,25-ketonide.

For the preparation of the ketonide, the acids to be employed are common to those enumerated above for the general conversion, but advantageous ones are exemplified by sulfuric acid, p-toluenesulfonic acid and Lewis acids such as boron trifluoride.

As for the ketone, acetone is most advantageously used.

For example, an Alisol B compound is dissolved or suspended in e.g. acetone or a mixture of acetone and conventional solvents such as chloroform, methylene chloride, and the acid is added. The reaction is carried out at room temperature for 10 to 20 minutes.

As the resulting ketonide can easily be converted into the corresponding vic-dihydroxy compound by treatment with an acid in an aqueous medium, the formation of the ketonide also provides a very desirable route for the Alisol A compounds from the Alisol B compounds.

For example, thus-obtained Alisol A (23,24)-acetonide or Alisol A (24,25)-acetonide 23-monoacetate can be converted to Alisol A and Alisol A 24 monoacetate respectively in an aqueous medium in the presence of acid as described above.

The present Alisol A compounds show remarkable hypochlolesterolemic activities.

Test 1

Hypocholesterolemic activity of ALMA (Alisol A 24-monoacetate) in rats fed on an atherogenic diet.

Weanling SD–JCL/T male rats, weighing about 100 grams were divided into groups each consisting of five rats. They were housed individually in clean metal cages and fed on an atherogenic diet (Diet B), containing 1% of cholesterol and 0.2% of sodium cholate with or without the test sample. The sample was mixed into the diet after being dissolved in diethylether or ethtanol. After 10-day feeding the rats were killed by decapitation and blood plasma and liver were immediately collected. Plasma and liver total cholesterol were determined by autoanalyzer and Liebermann-Burchard reaction, respectively.

The significant hypocholesterolemic activity of ALMA, in the dose-response, is shown in Table 1. That is, in spite of feeding on a relatively large amount of cholesterol (1% in diet), only one-tenth or below in weight of ALMA markedly exerted hypocholesterolemic activity, as manifested by the depression of total plasma cholesterol and C/P ratio as well as the amelioration of liver lipid pattern.

TABLE 1

| | F.B. wt. (g.) | Food (g./rat/day) | L. wt. (percent of B. wt.) | Plasma lipids (mg./100 ml.) | | | | Liver lipids (g./100 g.) | | |
|---|---|---|---|---|---|---|---|---|---|---|
| | | | | T. ch. | P.L. | c/p | T.G. | Fat | T. ch. | P.L. |
| Normal | 204 | 20.1 | 5.67 | 89 | 126 | 0.71 | 50 | 3.94 | 0.22 | 2.85 |
| Control | 137 | 11.8 | 6.63 | 266 | 144 | 1.84 | 47 | 9.41 | 2.37 | 2.18 |
| ALMA: | | | | | | | | | | |
| 0.0125% | 139 | 11.9 | 7.17 | 187 | 166 | 1.13 | 66 | 7.90 | 1.86 | 2.09 |
| 0.025% | 140 | 11.8 | 7.17 | 182 | 165 | 1.11 | 69 | 6.52 | 1.39 | 2.10 |
| 0.05% | 136 | 11.9 | 7.13 | 171 | 187 | 0.92 | 72 | 6.53 | 1.10 | 2.31 |
| 0.1% | 132 | 11.6 | 7.62 | 155 | 158 | 0.98 | 71 | 5.76 | 0.75 | 2.28 |
| 0.2% | 132 | 11.7 | 7.35 | 144 | 159 | 0.91 | 57 | 5.92 | 0.82 | 2.51 |

NOTE.—F.B. wt.=Final body weight; L. wt.=Liver weight; P.L.=Phospholipid; Fat=Crude fat; T.G.=Triglyceride; Food=Food intake; T. ch.=Total cholesterol; c/p=Total cholesterol/phospholipid; g.=gram(s).

Test 2

ALMA, Alisol A, Alisol B 23-monoacetate, Alisol B were tested as to their activity in ameliorating elevated plasma and liver lipids at the dose of 0.1% in diet (about 90 mg/Kg. body weight), in comparison with β-sitosterol (β-Sit), cholestane-triol (CT) and p-chlorophenoxyisobutyric acid (CPIB which are known and widely used as hypocholesterolemics, respectively.

The results are shown in Table 2, in terms of efficacy (percent) calculated according to the following formula:

TABLE 2

| Compounds | Percent | Efficacy (percent) | | | |
|---|---|---|---|---|---|
| | | P.T. ch. | P. c/p | L.F. | L.T. ch. |
| ALMA | 0.1 | 61 | 64 | 65 | 61 |
| Alisol A | 0.1 | 54 | 45 | 45 | 30 |
| Alisol B 23-monoacetate | 0.1 | 51 | 46 | 49 | 26 |
| Alisol B | 0.1 | 0 | 34 | 47 | 20 |
| β-Sit | 0.25 | 0 | 0 | 29 | 26 |
| CT | 0.25 | 26 | 26 | 41 | 32 |
| CPIB | 0.1 | 0 | 0 | 18 | 0 |

NOTE.—P.T. ch.=Plasma total cholesterol; P. c/p=Plasma total cholesterol/phospholipid; L.F.=Liver Fat; L.T. ch.=Liver total cholesterol.

One of the characteristics of the Alisol compounds resides in their low toxicity; for example, ALMA has $LD_{50}$ higher than 5100 mg./kg., when administered orally to mice.

When the present Alisol A compounds (Alisol A, Alisol A 24-monoacetate) are used for the purpose of treating or preventing hypercholesterolemia, oral daily dose is usually from about 0.5 gram to about 2 grams, preferably about 1 gram, for a human adult.

The compounds of the present invention which are active against hypercholesterolemia can be administered solely, or in combination with a pharmaceutically acceptable carrier, or can be administered together with other medical compound(s) with or without any other pharmameutically acceptable carrier(s), the compounds being in any case administered as powder, tablets, capsules, syrups, solution, etc., for oral administration.

The choice of carrier is to be determined by the preferred form of administration, the solubility of the compounds and standard pharmaceutical practice.

Alisol B 23-monoacetate also has hypocholesterolemic activity but not quite equal to that of the A compounds.

The following examples set forth presently preferred exemplary embodiments of the present invention.

Throughout the present specification, the abbreviations N, mg., g., kg., ml., l., and ° C. mean normal, milligram(s), gram(s), kilogram(s), milliliter(s), liter(s), and degrees centigrade, respectively.

Isolation of Alisol B and/or Alisol B 23-monoacetate:

EXAMPLE 1

2 kg. of rhizome of *Alisma Plantago-aquatica* L. is milled and extracted twice with 5 l. portions of chloroform for 4 hours each.

The extracts are combined and the solvent is distilled off, to leave 110 g. of a dark brown oil. This oil is dissolved in 1 liter of benzene, and column chromatography is carried out on the resulting solution using 320 g. of silica gel. First, the column is eluted with 4 liters of benzene, and on evaporating the solvent, 48 g. of a Fraction (I) composed predominantly of a higher fatty acid ester is obtained.

The column is then eluted with 2.4 liters of a mixture of benzene and chloroform (3:1), 3 liters of chloroform and 1 liter of a mixture of chloroform and ethyl acetate (1:1). The eluates are combined and the solvents are distilled off to leave 43 g. of a brown oily substance (Fraction II). The column is further eluted with 1.5 liters of ethyl acetate and then with 2 liters of acetone to obtain 20 g. of a yellow oily product (Fraction III).

Fraction II is dissolved in 200 ml. of benzene, and charged on a column packed with 300 g. of silica gel.

First, the column is eluted with 2.1 liters of a mixture of benzene and acetone (20:1) to obtain 17 g. of an oily substance.

Then, on passing a mixture of benzene and acetone (10:1) Alisol B 23-monoacetate is eluted out. From the Alisol B 23-monoacetate-containing eluate (800 ml.), the solvent is distilled off to leave 8.1 g. of a yellow oily product. Being allowed to stand in a cold place, the oil separates crystals, which are collected by filtration (yield 1.1 g.) and dissolved in a small amount of ethyl acetate, followed by the addition of n-hexane. The solution is allowed to stand to obtain pure Alisol B 23-monoacetate as colorless prisms melting at 162° to 164° C. and showing $[\alpha]_D^{23}+121°$ (c.=1.0, chloroform).

*Chemical analysis.*—Calculated for $C_{32}H_{50}O_5$ (percent): C, 74.67; H, 9.79. Found (percent): C, 74.81; H, 9.71.

On the other hand, Fraction III (20 g.) is dissolved in 200 ml. of ethyl acetate and the solution is allowed to pass columnwise over 50 g. of chromatographic activated carbon. The column is eluted with 2 liters of ethyl acetate, whereupon 15 g. of an eluate (yellow oily substance) is obtained.

Column chromatography is then carried out on this substance by the use of 320 g. of silicia gel, and the column is eluted with a mixture of benzene and acetone (7:1). One gram of a yellow oily fraction is removed on the first pass of 500 ml. of the mixed solvent, and 1.1 g. of an Alisol B fraction is eluted out by passing another 1 liter of the mixed solvent.

The latter fraction is re-chromatographed with a column packed with 20 g. of silica gel, and the column is eluted with a mixture of benzene and acetone (5:1) to yield 240 mg. of Alisol B.

On recrystallization from ethyl acetate, it forms colorless prisms melting at 166° to 168° C., showing $[\alpha]_D^{23}+130°$ (c.=1.0, chloroform).

*Chemical analysis.*—Calculated for $C_{30}H_{48}O_4$ (percent): C, 76.22; H, 10.24. Found (percent): C, 75.86; H, 10.25.

EXAMPLE 2

100 g. of the dark brown oil obtained from *Alisma Plantago-aquatica* L. in the same manner as the initial chloroform extraction in Example 1 is refluxed for 4 hours, together with 1 liter of methnol, 200 ml. of water and 40 g. of anhydrous potassium carbonate. A major portion of the methanol is recovered by distillation, and 800 ml. of water is added to the residue. The mixture is extracted twice by shaking with 800 ml. each of ethyl acetate. The ethyl acetate layers are combined, washed with water and dried, and the solvent is distilled out to leave 30 g. of a brown non-saponifiable neutral lipid.

This non-saponifiable neutral liquid is charged on a column packed with 60 g. of chromatographic activated carbon, and the column is eluted with three portions of 1.2 litres each of benzene so that Fractions I, II and III are obtained, weighing 16.5, 4.5 and 1.1 g., respectively. Further elution of the column with ethyl acetate gives a fraction containing Alisol A.

Fractions II and III are combined and column-chromatographed with 150 g. of silica gel. On the first passage of 1 liter of a mixture of benzene and acetone (10:1), 1.2 g. of a yellow oily substance is separated, and on the subsequent passage of 1.1 liters of a mixture of benzene and acetone (7:1), 2.6 g. of an Alisol B containing fraction is obtained as yellow oil. This Alisol B friction is chromatographed by the use of 20 g. of silica gel in the same manner as in Example 1, whereupon Alisol B (2.0 g.) is isolated. On recrystallization, from ethyl acetate, it forms colorless prisms melting at 166° to 168°.

EXAMPLE 3

1.3 kg. of the neutral lipid fraction obtained from rhizome of *Alisma Plantago-aquatica* L. var. *orientale* Samuels is column-chromatographed on 2.6 kg. of activated carbon, and the column is eluated with benzene, ethyl acetate and a mixture of ethyl acetate and methanol (1:1) to obtain Fraction I (950 g.) and Fraction II (235 g.) and Fraction III (63 g.) respectively.

Fraction I is allowed to stand in a cool place to separate crystals, which are collected by filtration and washed with a mixture of n-hexane and ethyl acetate (8:1) to obtain crude crystals. The crystals are further column-chromatographed on 500 g. of silca gel, and the column is eluted with a mixture of benzene and acetone (10:1) to yield 30 g. of colorless crystals of Alisol B 23-monoacetate.

Recrystallization from a mixture of n-hexane and acetone gives 22 g. of the pure crystals of Alisol B 23-monoacetate, melting at 162° to 164° C.

Conversion of Alisol B compounds into Alisol A compounds:

EXAMPLE 4

Alisol B (500 mg.) is dissolved in a mixture of 2 ml. of dioxane and 1 ml. of water, followed by the addition of 100 mg. of p-toluenesulfonic acid. The mixture is allowed to stand at room temperature for 1 hour. To the reaction mixture is added 30 ml. of water.

The aqueous mixture is extracted twice with 20 ml. each of ethyl acetate. The ethyl acetate extracts are combined, washed twice with 20 ml. each of water, and dried, and the solvent is distilled out to leave 480 mg. of a colorless syrupy residue predominantly containing Alisol A.

Column chromatography of the crude product on 35 g. of silica-gel is carried out by the use of a mixture of benzene and acetone (3:1) as an eluant. Evaporation of the solvent from the Alisol A-containing eluate (550 ml.) gives 300 mg. of pure Alisol A as colorless powder. It shows $[\alpha]_D^{21}+99°$ (c.=1.0 chloroform).

EXAMPLE 5

A solution of 300 mg. of Alisol B 23-monoacetate in a mixture of 0.8 ml. of glacial acetic acid and 0.3 ml. of water is heated at 70° C. for 2 hours. To the reaction mixture is added 10° ml. of water, and the aqueous mixture is extracted three times with 20 ml. each of ethyl acetate. The extracts are combined, washed twice with 20 ml. each of water. After drying, the solvent is distilled off to leave 280 mg. of a pale yellow oily substance. A drop of ethyl acetate is added to the oily substance, which is then allowed to stand to separate colorless crystals, which are collected by filtration and washed with a small amount of ethyl acetate to obtain 170 mg. of crystals. Recrystallization from acetone gives 95 mg. of pure Alisol A 24-monoacetate melting at 194° to 196° C. and showing $[\alpha]_D^{23}+86°$ (c.=1.0 chloroform).

*Elementary analysis.*—Calculated for $C_{32}H_{52}O_6$ (percent): C, 72.14; H, 9.84. Found (percent): C, 72.20; H, 9.96.

EXAMPLE 6

A solution of 30 g. of Alisol B in 30 ml. of glacial acetic acid is heated at 80° C. for 45 minutes. The solvent is distilled off under reduced pressure, and 100 ml. of ethyl acetate is added to the residue. The mixture is allowed to stand overnight to separate colorless crystals, which are collected by filtration and washed with a small amount of ethyl acetate to obtain 12 g. of Alisol A 24-monoacetate.

The filtrate is combined with the washing, and the solvent is distilled off. Column chromatography is carried out on the residue with 280 g. of silica gel, and the column is eluted with 4 liters of a mixture of benzene and acetone (20:1), then with 3.2 liters of a mixture of benzene and acetone (7:1) to separate 2.5 g. and 8 g. of the fractions, respectively. Then, the column is further eluted with a mixture of benzene and acetone (5:1) to obtain 10 g. of Alisol A 24-monoacetate-containing fraction. Treatment of this fraction with ethyl acetate yields 6 g. of Alisol A 24-monoacetate. Total yield amounts to 18 g.

EXAMPLE 7

A solution of 500 mg. of Alisol B in a mixture of 2 ml. of dioxane, 1 ml. of water and 0.05 ml. of 10% aqueous sulfuric acid is allowed to stand at room temperature (25° C.) for 90 minutes. 20 ml. of water is added to the reaction mixture, which is then extracted twice by shaking with 40 ml., and 30 ml. of ethyl acetate. The ethyl acetate layers are combined, washed twice with 40 ml. each of water and dried over sodium sulfate. Then, the solvent is distilled off to obtain the residue containing Alisol A.

500 mg. of the residue is acetylated with 3 ml. of pyridine and 3 ml. of acetic anhydride by allowing the mixture to stand overnight at room temperature (25° C.) to obtain 630 mg. of the crude acetate. This is purified by column-chromatography with 20 g. of silica gel, and the column is eluted with 700 ml. of a mixture of benzene and acetone (7:1) to obtain 390 mg. of Alisol A 11,23,24-tri-acetate. On crystallization from a mixture of methanol and methylene chloride, it forms colorless needles melting at 231 to 233° C. and showing $[\alpha]_D^{23} +56.8°$ (c.=1.0 chloroform)

*Elementary analysis.*—Calculated for $C_{36}H_{56}O_8$ (percent): C, 70.58; H, 8.91. Found (percent): C, 70.10; H, 9.15.

1.3 g. of Alisol A 11,23,24-triacetate is heated in a mixture of 70 ml. of methanol and 35 ml. of a 10% aqueous potassium carbonate solution for 6 hours. The solvent is distilled off, and 200 ml. of water is added to the residue. The aqueous mixture is extracted twice with 150 ml. each of ethyl acetate. The ethyl acetate layers are combined, washed with water and dried. The solvent is distilled off to obtain 1.1 g. of colorless sticky substance. This substance is charged on a column packed with 70 g. of silica gel and the column is eluted with a mixture of benzene and acetone (3:1).

The solvent is distilled off from 1.5 liters of the eluate containing Alisol A to yield 800 mg. of Alisol A as colorless powder showing $[\alpha]_D^{23}+99°$ (c.=1.0 chloroform).

EXAMPLE 8

2 kg. of dried rhizome of *Alisma Plantago-aquatica* L. var. *orientale* Samuels is extracted with methanol, and the extract is further extracted with ethyl acetate. 100 g. of the resulting fat-soluble fraction is heated along with 300 ml. of acetic acid and 50 ml. of water at 80° C. for 2 hours.

The solvent is distilled off under reduced pressure, and the residue is dissolved in 400 ml. of ethyl acetate. The ethyl acetate solution is washed twice with 400 ml. each of water, followed by drying over sodium sulfate. Then the solvent is distilled off to yield 95 g. of a reddish-brown oily substance. The substance is charged on a column packed with 200 g. of chromatographic activated carbon. The column is eluted with 5 liters of benzene and, then, with 6 liters of ethyl acetate. The solvent is distilled off from the ethyl acetate eluate to leave 12 g. of a yellow oily substance.

This substance is column-chromatographed with 200 g. of silica gel, and the column is first eluted with 1 liter of a mixture of benzene and acetone (10:1). Then, the elution is continued with a mixture of benzene and acetone (5:1), and the 2.5 g. portion obtained by the elution with the first 2 liters of the solvent is discarded. The elution with 1.2 liters of the solvent gives 4.2 g. of a yellow oily substance predominantly containing Alisol A 24-monoacetate.

The elution is further continued with a mixture of benzene and acetone (3:1) and the portion (1.8 g.) obtained with the first 1 liter of the solvent is discarded. The portion subsequently obtained with an additional 4 liters of said solvent gives 1.2 g. of an Alisol A-containing fraction.

3.2 g. of the Alisol A 24-monoacetate-containing fraction is treated with a small amount of ethyl acetate, whereupon a crystalline substance separates out. The crystals are collected by filtration and washed with a small amount of ethyl acetate to obtain 2.2 g. of Alisol A 24-monoacetate. On recrystallization from acetone, it gives colorless prisms melting at 194° to 196° C. and showing $[\alpha]_D^{23}+86°$ (c.=1.0 chloroform).

*Elementary analysis.*—Calculated for $C_{32}H_{52}O_6$ (percent): C, 72.14; H, 9.84. Found (percent): C, 72.08; H, 9.90.

On the other hand, the Alisol A-containing fraction (1.2 g.) is again column-chromatographed with 70 g. of silica gel and the column is eluted with a mixture of benzene and acetone (3:1). From the Alisol A-containing fraction, 700 mg. of colorless powder of Alisol A is obtained $[\alpha]_D^{26}+98.8°$ (c.=1.0 chloroform).

This product is acetylated with acetic anhydride and pyridine by allowing the mixture to stand overnight at room temperature and the resulting Alisol A triacetate is recrystallized from methanol to yield 720 mg. of Alisol A 11,23,24-triacetate.

EXAMPLE 9

50 g. of a fat-soluble fraction prepared from rhizome of *Alisma Plantago-aquatica* L. var. *orientale* Samuels, in the same manner as Example 1 is heated along with 200 ml. of dioxane, 75 ml. of water, and 15 g. of oxalic acid at 80° C. for 2 hours.

The solvent is recovered by distillation under reduced pressure and the residue is dissolved in 250 ml. of ethyl acetate. The solution is washed three times by shaking with 200 ml., 150 ml. and 150 ml. portions of water, then is dehydrated with anhydrous sodium sulfate. The solvent is distilled off to leave 47 g. of a brown oily substance. Column chromatography is carried out on this substance using 100 g. of chromatographic activated carbon, and the column is eluted first with 2.5 liters of benzene and then with 3 liters of ethyl acetate. The solvent is distilled out of the ethyl acetate eluate to obtain 6.3 g. of a yellow oily substance.

This substance is again column-chromatographed with 100 g. of silica gel and the column is eluted first with 500 ml. of a mixture of benzene and acetone (10:1). Then, the column is further eluted with a mixture of benzene and acetone (5:1) and 1.2 g. of the resulting yellow oily matter obtained by the first 30 ml. elution is discarded. From the eluates subsequently obtained with additional 800 ml. of the solvent, 20 g. of a yellow oily substance is obtained, predominantly containing Alisol A 24-monoacetate.

The column is further eluted with a mixture of benzene and acetone (3:1), and the 1 g. of the fraction which is obtained with the first 50 ml. of the solvent is discarded. Further elution of the column with 2 liters of the solvent yields 0.7 g. of an Alisol A-containing fraction.

The Alisol A 24-monoacetate-containing fraction obtained above is treated with a small amount of ethyl acetate, whereupon colorless crystals of Alisol A 24-monoacetate separate out. The crystals are collected by filtration and washed with a small amount of ethyl acetate to obtain 1.2 g. of Alisol A 24-monoacetate. On recrystallization from acetone, it forms colorless prisms melting at 194° to 196° C. and showing $[\alpha]_D^{23}+86°$ (c.=1.0, chloroform).

Next, the Alisol A-containing fraction (0.7 g.) obtained above is rechromatographed on 30 g. of silica-gel.

Elution with a mixture of benzene and acetone (3:1) affords colorless powder of Alisol A (yield 360 mg.). Acetylation of the compound with pyridine (2 ml.) and acetic anhydride (2 ml.) for 16 hours gives 460 mg. of crude Alisol A 11,23,24-triacetate. Recrystallization from a mixture of methylene chloride and methanol affords 380 mg. of colorless needles, melting at 231° to 233° C. $[\alpha]_D^{24}+57°$ (c.=0.5, chloroform).

EXAMPLE 10

A non-saponifiable neutral lipid (9 g.) obtained upon saponification of a fat-soluble fraction of *Alisma Plantago-aquatica* L. var. *orientale* Samuels is heated along with 70 ml. of acetic acid and 15 ml. of water at 80° C. for 2 hours.

The solvent is distilled off, and the residue is dissolved in 150 ml. of ethyl acetate. The ethyl acetate fraction is washed twice with 100 ml. each of water, followed by drying. The solvent is then distilled off to leave 9 g. of a brown residue. Column chromatography is carried out on this residue using 150 g. of silica gel. The column is eluted first with 2 liters of a mixture of benzene and acetone (5:1) and then with 2 liters of a mixture of benzene and acetone (3:1) to obtain 2.5 g. of a yellow oily substance predominantly containing Alisol A.

This oil is again column chromatographed with 70 g. of silica gel, and the column is eluted with a mixture of benzene and acetone (3:1) to collect Alisol A-containing fractions. The solvent is distilled off to yield 1.5 g. of a colorless powder of Alisol A.

The same procedure as above is conducted by the use of acetic acid alone to obtain 1.5 g. of Alisol A 24-monoacetate melting at 196° to 198° C.

EXAMPLE 11

1 g. of Alisol B 11,23-diacetate is dissolved in a mixture of 6 ml. of glacial acetic acid and 2 ml. of water, and the mixture is heated at 70° C. for 50 minutes. To the reaction mixture is added 30 ml. of water and the resulting white precipitates are collected by filtration, washed with water and dried. When this product is allowed to crystallize from methanol, 300 mg. of crystalline Alisol A 11,24-diacetate is obtained. The mother liquor is column-chromatographed with 20 g. of silica gel, and the column is eluted with a mixture of benzene and acetone (5:1) to yield 200 mg. of Alisol A 11,24-diacetate, which is combined with the crystalline product obtained above. The mixture is recrystallized from methanol to yield colorless needless melting at 204° to 206° C. and showing $[\alpha]_D^{23}+86.7°$ (c.=1.0, chloroform).

*Elementary analysis.*—Calculated for $C_{34}H_{54}O_7$ (percent): C, 71.04; H, 9.47. Found (percent): C, 70.91; H, 9.42.

EXAMPLE 12

To a solution of 1 g. of Alisol B in 12 ml. of acetone, there is added 0.2 ml. of BF$_3$-etherate, and the mixture is allowed to stand at room temperature for 15 minutes. 50 ml. of water are added to the reaction mixture, which is then extracted with 30 ml. of ethyl acetate. The ethyl acetate layer is washed successively with 20 ml. of water, 20 ml. of a 5% aqueous sodium bicarbonate solution and 2 ml. of water.

The solvent is distilled off to obtain 1.2 g. of a sticky residue. The residue is chromatographed on silica gel (30 g.) and eluted with a mixture of benzene and acetone (6:1) to give 750 mg. of Alisol A (23,24)-acetonide as colorless powder showing $[\alpha]_D^{22}+69.0°$ (c.=1.0, chloroform).

110 mg. of Alisol A (23,24)-acetonide is heated with 7 ml. of 80% acetic acid at 90° for 2 hours. The reaction mixture is concentrated to dryness and the residue is column-chromatographed with 10 g. of silica gel. The column is eluted with a mixture of benzene and acetone (2:1) to obtain 70 mg. of Alisol A showing $[\alpha]_D^{23}+104.2°$ (c.=1.0, chloroform).

*Elementary analysis.*—Calculated for $C_{30}H_{50}O_5$ (percent): 73.43; H, 10.27. Found (percent): C, 73.24; H, 10.38.

EXAMPLE 13

To a solution of 120 mg. of Alisol B 23-monoacetate in 4 ml. of acetone, there is added 0.05 ml. of BF$_3$-etherate, and the mixture is treated as in Example 12 to give 120 mg. of an oil. The oil is column chromatographed with 20 g. of silica gel. The column is eluted with a mixture of benzene and acetone (10:1) to yield 100 mg. of Alisol A (24,25)-acetonide 23-monoacetate. On recrystallization from aqueous methanol it gives 98 mg. of colorless needles melting at 192 to 193° C. and showing $[\alpha]_D^{22}+61.8°$ (c.=1.0, chloroform).

*Elementary analysis.*—Calculated for $C_{35}H_{56}O_6$ (percent): C, 73.39; H, 9.85. Found (percent): C, 73.37; H, 10.01.

150 mg. of Alisol A (24,25)-acetonide 23-monoacetate is heated with 3 ml. of dioxane and 0.5 ml. of 2 N-sulfuric acid at 90° C. for one hour. The reaction mixture is diluted with 10 ml. of water and extracted twice with 20 ml. each of ethyl acetate. The extracts are combined and washed with 10 ml. of water. After drying over sodium sulfate, the solvent is distilled off to leave 130 ml. of a colorless sticky residue, which is treated with a small amount of ethyl acetate to crystallize. These crystals are collected by filtration and washed with ethyl acetate to obtain 70 mg. of Alisol A 24-monoacetate.

Further, the filtrate is combined with washing and the solvent is distilled off to leave 50 mg. of a residue. Column chromatography is carried out on the residue with 10 g. of silica gel, and the column is eluted with 70 ml. of a mixture of benzene and acetone (3:1) to obtain 20 mg. of Alisol A 24-monoacetate.

EXAMPLE 14

To a solution of 1 g. of Alisol B in 10 ml. of acetone, there is added 0.01 ml. of sulfuric acid, and the mixture is allowed to stand at 28° C. for 40 minutes.

The reaction mixture is diluted with 5 ml. of a 5% aqueous bicarbonate solution, followed by addition of 30 ml. of water.

Thus-treated reaction mixture is extracted with 30 ml. of ethyl acetate. The ethyl acetate extracts are combined, washed twice with 20 ml. of water, and dried with sodium sulfate. The solvent is distilled off to leave 1.18 g. of a colorless sticky residue.

The residue is dissolved in a mixture of benzene and acetone (6:1) and column-chromatographed with 30 g. of silica gel, and the column is eluted with the same solvent as above to obtain 690 mg. of Alisol A (23,24)-acetonide as colorless powder showing $[\alpha]_D^{22}+69.0°$ (c.=1.0, chloroform).

*Elementary analysis.*—Calculated for $C_{33}H_{54}O_5$ (percent): C, 74.67; H, 10.26. Found (percent): C, 74.22; H, 10.10.

EXAMPLE 15

To a solution of 1 g. of Alisol B 23-monoacetate in 10 ml. of acetone, there is added 0.01 ml. of sulfuric acid, and the mixture is allowed to stand at 28° C. for 80 minutes.

The reaction mixture is diluted with 5 ml. of a 5% aqueous sodium bicarbonate solution, followed by addition of 30 ml. of water. Thus-treated reaction mixture is extracted with 30 ml. of ethyl acetate. The ethyl acetate extract is combined, washed twice with 30 ml. of water, and dried with sodium sulfate. The solvent is distilled off to leave 1.22 g. of a colorless sticky residue. Column chromatography is carried out on the residue with 50 g. of silica gel and the column is eluted with a mixture of benzene and acetone (10:1), then with 80 ml. of the same solvent as above to separate 70 mg. of impurities. Then the column is further eluted with 300 ml. of the same solvent as above to obtain 1.0 g. of Alisol A (24,25)-acetonide 23-monoacetate as a colorless sticky substance.

On recrystallization from aqueous methanol, it forms colorless needles or plates melting at 186° to 188° C. (Yield 750 mg.).

Further recrystallization from aqueous methanol gives pure crystals melting at 192° to 193° C., and the pure sample shows $[\alpha]_D^{22}$ 64.1° (c.=1.0, chloroform).

*Elementary analysis.*—Calculated for $C_{35}H_{56}O_6$ (percent): C, 73.39; H, 9.85. Found (percent): C, 72.99; H, 9.65.

What is claimed is:

1. A method for producing a compound of the formula

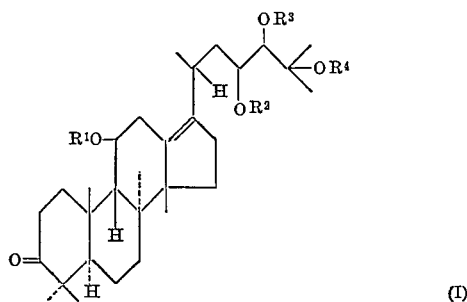

which comprises bringing a compound of the formula

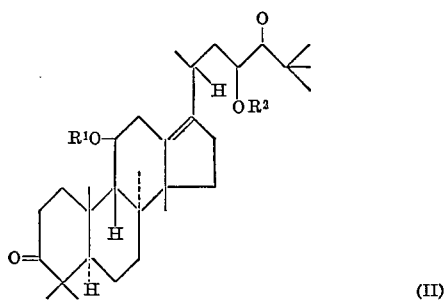

wherein each of $R^1$, $R^2$, $R^3$ and $R^4$ is hydrogen, an acyl moiety of lower monocarboxylic acid having at most 4 carbon atoms or a lower alkoxycarbonyl having at most 5 carbon atoms, or $R^2$ and $R^3$, taken together, represent an alkylidene having 1 to 5 carbon atoms, into contact with an acid selected from the group consisting of a mineral acid, a sulfonic acid, a carboxylic acid and a Lewis acid.

2. A method according to claim 1, wherein each of $R^1$ and $R^2$ is H, an acyl of lower monocarboxylic acid having at most 4 carbon atoms or a lower alkoxycarbonyl having at most 5 carbon atoms.

3. A method according to claim 1, wherein a crude extract of an Alismataceae plant or its saponification product, is brought into contact with the acid, and then recovering thus-produced compound of Formula I from the reaction mixture.

4. A method according to claim 1, wherein the contact of the reagents is effected in a ketone of 3 to 5 carbon atoms, whereby the compound of Formula I is produced as the ketonide.

5. A method according to claim 1, wherein the acid is acetic acid.

6. A method according to claim 1 wherein the acid is sulfuric acid.

7. A method according to claim 1 wherein the acid is toluenesulfonic acid.

8. A method according to claim 1 wherein the acid is boron trifluoride.

9. A process for producing a member selected from the group consisting of compounds of Formula I, their 23-monoacetates, and mixtures thereof which comprises extracting an Alismataceae plant with a solvent, subjecting the extract to a column chromatography, and collecting the fraction containing said member.

10. A process according to claim 9, wherein the carrier for the column chromatography is silica gel.

11. A process according to claim 9, wherein the carrier for the column chromatography is alumina.

12. A process according to claim 9, wherein the plant is of the genus Alisma.

13. A process according to claim 9, wherein the extract is saponified with a hydroxide or carbonate of an alkali metal in a lower alcohol, water or a mixture thereof, whereby the compound of Formula II is recovered.

14. The substantially pure compound of Formula II, which has the following properties:
Melting point 166° to 168° C. (measured on Kofler block).
$[\alpha]_D^{23}$ +130°±7° (C=1.0, chloroform).

15. The substantially pure compound of Formula II, 23-monoacetate which has the following properties:
Melting point 162° to 164° C. (measured on Kofler block).
$[\alpha]_D^{23}$ +121°±6° (c.=1.0, chloroform).

16. The (23,24)-acetonide of Formula I.

17. The (24,25)-acetonide 23-monoacetate of Formula I.

No references cited.

ELBERT L. ROBERTS, Primary Examiner

U.S. Cl. X.R.

260—397.2

UNITED STATES PATENT OFFICE
CERTIFICATE OF CORRECTION

Patent No. 3,579,505        Dated May 18, 1971

Inventor(s) Masuo Miyamoto and Tadakazu Murata

It is certified that error appears in the above-identified patent and that said Letters Patent are hereby corrected as shown below:

Col. 1, formula II and Col. 13, bottom line:

change 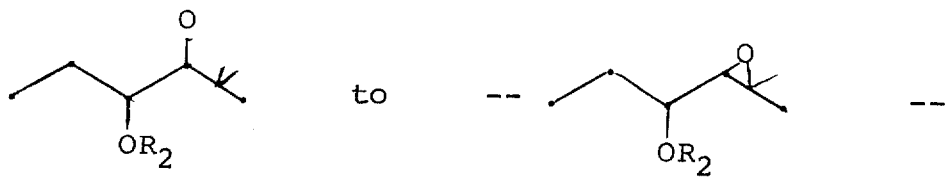 --

In the heading insert, after the application serial number, -- claims priority applications Japan, Sept. 25, 1967 No. 61620/67; Oct. 4, 1967 No. 63966/67; Oct. 6, 1967 64441/67; and Sept. 3, 1968 63325/67. --

Signed and sealed this 28th day of December 1971.

(SEAL)
Attest:

EDWARD M. FLETCHER, JR.
Attesting Officer

ROBERT GOTTSCHALK
Acting Commissioner of Patents